United States Patent [19]

Lincoln et al.

[11] Patent Number: 4,510,887

[45] Date of Patent: Apr. 16, 1985

[54] ANIMAL FECAL COLLECTION SYSTEM

[75] Inventors: Kay L. Lincoln; Ricardo Ochoa, both of Portage, Mich.

[73] Assignee: The Upjohn Company, Kalamazoo, Mich.

[21] Appl. No.: 522,433

[22] Filed: Aug. 11, 1983

[51] Int. Cl.³ .............................................. A01K 23/00
[52] U.S. Cl. ...................................................... 119/95
[58] Field of Search .................................. 119/95, 143

[56] References Cited

U.S. PATENT DOCUMENTS

| 2,974,635 | 3/1961 | McDowell | 119/143 |
| 3,792,687 | 2/1974 | Ehrman | 119/95 |
| 4,103,645 | 8/1978 | Tyler | 119/95 |

FOREIGN PATENT DOCUMENTS

| 2480562 | 10/1981 | France | 119/95 |
| 7411737 | 3/1976 | Netherlands | 119/95 |

OTHER PUBLICATIONS

Smyth, R. E., (1979): Fecal Cup for Collection of Feces in Male Rats, Lab. Anim. Sci., 29(5): 677–678.
Roerig, D. L., A. T. Hasegawa and R. I. H. Wang, (1980): Rat Restrainer for Separation and Collection of Urine and Feces, Lab. Anim. Sci., 30(3): 549–551.

Primary Examiner—Robert P. Swiatek
Attorney, Agent, or Firm—Flynn, Thiel, Boutell & Tanis

[57] ABSTRACT

A fecal collection system for an animal, such as a canine, which allows separate collection of urine and feces without cross-contamination. A fabric supporter is positionable on the hindquarters of the animal, which supporter has a harness which secures same to the animal. A fecal collection bag is adhered to the anus of the animal, and an adjustable bag enclosure which is attached to the rear of the supporter is then wrapped around the collection bag to enclose same. The bag enclosure is adjustable to support the weight of the collection bag.

16 Claims, 10 Drawing Figures

ANIMAL FECAL COLLECTION SYSTEM

FIELD OF THE INVENTION

This invention relates to a fecal collection system for an animal, such as a dog, which allows separate collection of urine and feces without cross-contamination.

BACKGROUND OF THE INVENTION

In drug metabolism research, it is often necessary to determine the amounts of drugs or metabolites excreted in the urine or feces of test animals. For exact determinations, neither sample can cross contaminate the other. Further, in microbiological studies, it is often necessary to collect and analyze the urine of a laboratory animal, and the collected sample cannot be contaminated by fecal flora. Still further, in research of this general type involving laboratory animals, it is often necessary to collect twenty-four hour urine samples from animals with diarrhea, and such samples must not be contaminated with feces.

While various collection systems have been developed in an attempt to permit the collection of samples of urine or feces from laboratory animals without cross-contamination, nevertheless most of the known collection systems have been undesirable since many have required that the animal be substantially or totally restrained when fitted with the collection system, and many of the known collection systems have been suitable solely for use on male animals or have not permitted separate collection of the urine and feces. Further, most of these known systems do not work on an animal with diarrhea, and to the best of our knowledge, none of these systems have been used on canines.

Accordingly, it is an object of this invention to provide an improved fecal collection system for a four-legged animal, such as a canine, which overcomes the disadvantages associated with prior collection systems.

More specifically, it is an object of this invention to provide an improved fecal collection system for an animal, as aforesaid, which is usable on animals with diarrhea, which is usable on both male and female animals, and which permits attachment of a fecal collection bag to the animal in such manner as to permit effective separation from the urine and at the same time does not create any undue comfort to or require restraining of the animal.

In the improved fecal collection system of this invention, there is provided a fabric supporter positionable on the hindquarters of the animal, which supporter has a harness which secures same to the animal. A fecal collection bag is adhered to the anus of the animal, and an adjustable bag enclosure which is attached to the rear of the supporter is then wrapped around the collection bag to enclose same. The bag enclosure is adjustable so as to support the weight of the collection bag.

This improved collection system possesses numerous advantages. For example, the fabric supporter is preferably contoured to fit on the hind quarters of the animal, and the enclosure protects the collection bag and assists in maintaining it in position. The supporter, in the preferred embodiment, is constructed of a medium-weight nylon/polyester blend fabric trimmed with bias tape and Velcro, whereby the fabric washes easily and is resistant to tearing, and all of the Velcro areas and straps are fully adjustable so that the fabric supporter will fit a wide range of animals. The system can also be utilized with either male or female animals without requiring any structural modification thereof, and when used on female animals, the supporter is adjusted so that the vulva protrudes through the provided opening, thereby allowing the animal to urinate normally. The collection bag can also be fully exposed by opening the fabric enclosure, thus permitting inspection or emptying of the bag without removing the fabric supporter.

Summarizing the structure and function of a preferred embodiment of the invention, specifically as applied to a dog, the collection system includes a colostomy bag which has affixed thereto an adhesive blanket with a proper size opening provided for the anus. This adhesive blanket is positioned around the dog's perianal area. A contoured fabric supporter, having right and left flaps, is positioned behind the dog's rear legs and beneath the colostomy bag. The right and left flaps are then folded forwardly and upwardly across the hindquarters of the dog so that the flaps overlap. The flaps are suitably secured together, as by Velcro fasteners. A harness is secured to the supporter to attach it to the dog. This harness preferably includes a chest strap which extends from the right and left flaps forwardly around the chest of the animal. The chest strap also connects to a body strap which extends around the dog's body directly rearwardly of the front legs, and a collar strap which extends around the neck of the animal. A pair of leg straps is secured to the lower rear edge of the fabric supporter, in the central portion thereof, and extend forwardly between the rear legs and then upwardly around the sides of the body for attachment to the fabric supporter. All of the straps are preferably of Velcro or similar material to permit them to be readily fastened to one another or to appropriate Velcro strips provided on the supporter. The supporter preferably has a fabric tongue portion which projects downwardly from the center of the lower edge thereof, which tongue portion has a suitable opening therethrough so that the supporter can be utilized on a female dog, which usage requires that the supporter be adjustably positioned so that the vulva protrudes through this latter opening. A fabric bag enclosure is secured to the outer face of the supporter and projects rearwardly therefrom. This bag enclosure is of a sheetlike fabric material and is positioned below the colostomy bag, but can be folded into a tubular construction so as to surround and hence enclose the bag. The enclosure has releasable fasteners, such as Velcro strips, along the edges to permit its formation into the tubular enclosure. The lower end of the tubular enclosure is then adjustably folded upwardly and secured by a fastener, such as an additional Velcro strip, so that the weight of the bag is borne by the enclosure. The supporter and the bag enclosure have an elongated slot formed centrally therein and opening downwardly from the upper edge thereof, which slot extends downwardly to a position just below the anal opening of the dog, thereby permitting the colostomy bag to extend through the slot and at the same time provide clearance for the dog's tail.

The fecal collection system was tested in a study of dogs with possible protein loosing enteropathy. In this study, $^{51}$Chromium labeled albumin was injected intravenously and $^{51}$Cr excretion was measured in the feces and urine. Normal subjects excrete only trace amounts of $^{51}$Chromium in the feces. It is imperative that the feces not be contaminated by the urine, which contains a majority of the label. The results of this test indicated that separation of urine and feces was well-maintained by the collection system. Normal subjects have very little $^{51}$Cr in the feces. However, dogs with malabsorption problems, as confirmed by a Xylose Absorption Test, definitely showed increased fecal exretion. Hence, the collection system of this invention is able to successfully maintain separation of urine and feces during collection.

The overall structural and functional relationships of the collection system according to this invention, together with additional objects and purposes thereof, will be apparent upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure and designated parts thereof. Said terminology will include the words specifically mentioned, derivatives thereof, and words of similar import.

DETAILED DESCRIPTION

Figure 1:
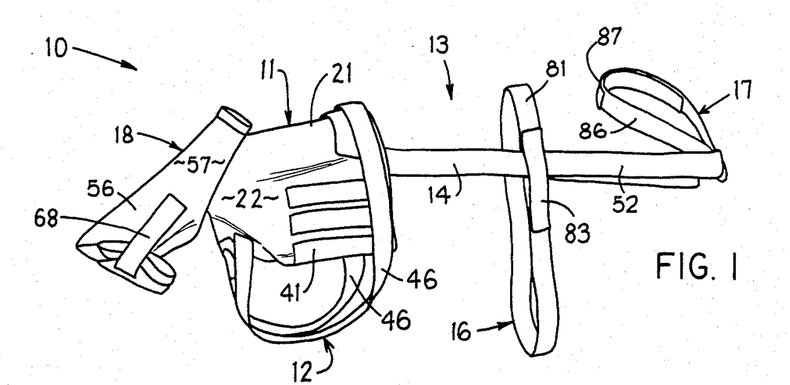
FIG. 1 is a perspective view illustrating the collection system of the invention in the position assumed when mounted on an animal such as a dog.
Figure 7:
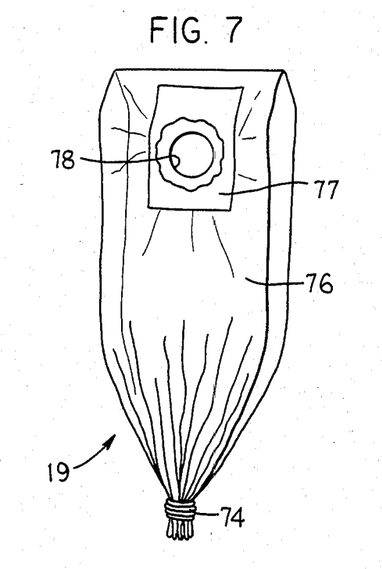
FIG. 7 is a perspective view which illustrates a typical colostomy bag as used in conjunction with the system of this invention.

FIG. 1 illustrates therein a fecal collection system 10 of this invention for use with four-legged animals, such as dogs, to allow the separate collection of urine and feces without cross-contamination, and without having to restrain the dog. This collection system 10 includes a supporter 11 adapted to be positioned over the hindquarters of the animal, which supporter 11 has leg straps 12 and a body harness 13 for permitting the supporter to be securely maintained on the animal without restraining the animal. The body harness includes a chest strap 14 which extends forwardly from the supporter 11 around the front chest of the animal, a body strap 16 which extends around the body of the animal directly behind the front legs, and a collar strap 17 which extends around the animal's neck and attaches to the front of the chest strap. A bag enclosure 18 is attached to and projects rearwardly from the supporter 11 for enclosing and supporting a collection bag 19 (FIG. 7).

Figure 2:
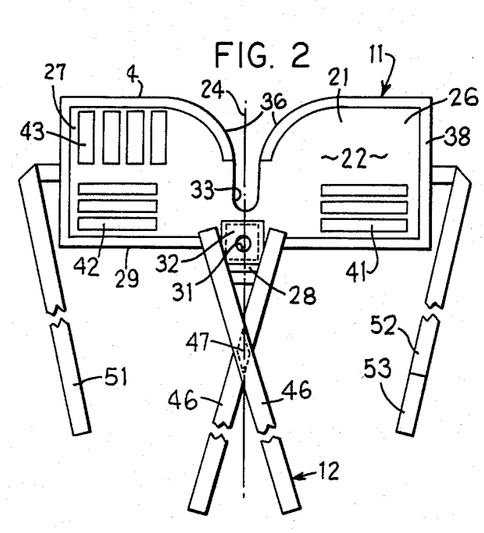
FIGS. 2 and 3 respectively illustrate the outer and inner faces of the supporter when in an open condition, together with the leg and chest straps as attached thereto.
Figure 3:
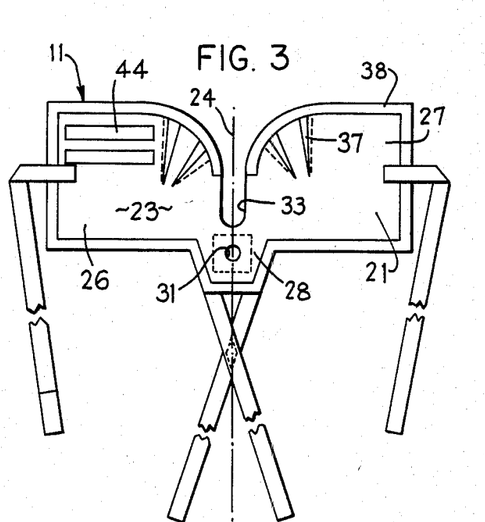

Considering now the supporter 11, and referring specifically to FIGS. 2 and 3, this supporter is formed from a sheet 21 of a suitable fabric material such as a medium-weight nylon/polyester blend material which can be easily washed and is resistant to tearing. This fabric sheet, which roughly approximates an elongated rectangle, defines outer and inner faces 22 and 23, respectively, the inner face being that side of the supporter which is adapted to engage the animal. The fabric sheet 21, as illustrated by FIG. 2, is substantially symmetrical about a centerline or plane 24 which is perpendicular to the plane of the sheet 21, whereby the sheet hence defines respective right and left flaps 26 and 27 which are effectively mirror images of one another about the plane 24 and are respectively adapted to overly the right and left hips of the animal when the supporter is positioned thereon.

The supporter 11 also includes a tongue portion 28 which is integral with the fabric sheet 21 and projects downwardly from the lower edge 29 substantially at the midpoint thereof. This tongue portion 28 has a circular opening 31 extending therethrough, which opening is disposed such that the center thereof is in the vicinity of, and preferably at least slightly below, the lower edge 29. A small rectangular sheet of fabric material 32 is disposed in overlying relationship to the sheet 21, and is affixed thereto as by stitching, so as to provide reinforcement for the fabric sheet 21 in the vicinity of the opening 31. This latter opening also extends through this secondary reinforcing sheet 32.

Fabric sheet 21 also has an elongated slot 33 formed therein, which slot extends downwardly from the upper edge 34 of the sheet and extends along and is centered relative to the centerline or plane 24. This slot 33 extends across approximately three-fourths the width of the fabric sheet and terminates in a rounded blind end which is disposed above but fairly close to the opening 31. The fabric sheet 21, adjacent the outer end of slot 33, is provided with suitable rounded corners 36 which extend between the side edges of the slot and the upper edge 34. During formation of the supporter 11, the fabric 21 preferably has darts or tucks 37 stitched therein adjacent each of the rounded corners 36 so as to provide the fabric sheet 21 with a slightly nonplanar contour so that the right and left flaps more readily conform to the hips of the animal when the supporter is positioned thereon.

Fabric sheet 21 has suitable edge binding 38 secured thereto, as by stitching, around substantially the entire periphery thereof, as illustrated by FIGS. 2 and 3.

To permit securement of the supporter 11 on the animal, the supporter is provided with various fasteners which, in the preferred embodiment, comprise Velcro strips due to the ease and simplicity with which such Velcro fasteners can be attached and detached. For this purpose, the right flap 26 of the supporter has a plurality, here three, of hook-type Velcro strips 41 secured thereto adjacent the outer lower corner thereof. These strips 41 are secured to the outer face 22 and are disposed so that the strips extend horizontally but are disposed vertically one above the other in closely spaced relationship. A similar arrangement of hook-type Velcro strips 42 is secured to the outer face of the left flap 27 adjacent the lower outer corner thereof. A further plurality of hook-type Velcro strips 43 are secured to the outer face 22 of left flap 27 adjacent the upper portion thereof. This plurality of strips 43, there being four strips in the illustrated embodiment, are disposed such that the individual strips extend vertically with the strips being positioned horizontally adjacent in closely spaced but substantially parallel relationship. These strips 43 extend from a position closely adjacent the side edge of the left flap to a location disposed adjacent the rounded corner 36. The inner face 23 of the supporter also has a plurality, here two, of loop-type Velcro strips 44 secured thereto, which strips 44 are secured to the inner face of the right flap adjacent the upper outer corner thereof. These strips 44 extend horizontally and are vertically spaced in substantially parallel relationship.

The supporter 11 has the leg straps 12 fixed thereto, which straps 12 comprise an identical pair of elongated flexible strips 46, also preferably loop-type Velcro. These strips 46 are disposed in substantially intersecting relationship as illustrated by FIG. 2, with the point or area 47 of intersection being fixed together, as by stitching. The upper free ends of these leg strips 46 extend substantially along the opposite sides of the tongue portion 28 and are fixed thereto, as by stitching.

The chest strap 14 is also fixed to the supporter 11. This chest strap includes a first elongated strap 51 formed as an elongated flexible strip having one end thereof fixedly secured, as by stitching, to the left flap 27 of the supporter, and a similar strip 52 has an end thereof secured to the right flap 26. These straps 51 and 52 have the ends thereof secured adjacent the side edge of the respective flap approximately midway between the upper and lower edges thereof. The chest straps 51 and 52 are each preferably of loop-type Velcro, and the one strap 52 has a short fastener portion 53 secured to the free end thereof, which fastener portion 53 preferably comprises a short section of hook-type Velcro which is oriented with the hooks facing inwardly, whereas the loops of the straps 51 and 52 preferably face outwardly. Hence, when the straps 51 and 52 extend along the sides of the animal and overlap in front of the chest, the hook portion 53 will lockingly engage the loops of the strap 51.

Figure 4:
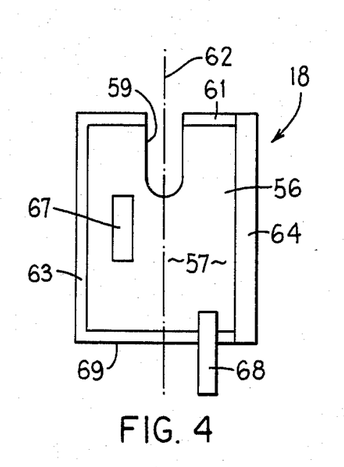
FIGS. 4 and 5 respectively illustrate the outer and inner faces of the bag enclosure when in an open condition, the bag enclosure being shown detached from the supporter.
Figure 5:
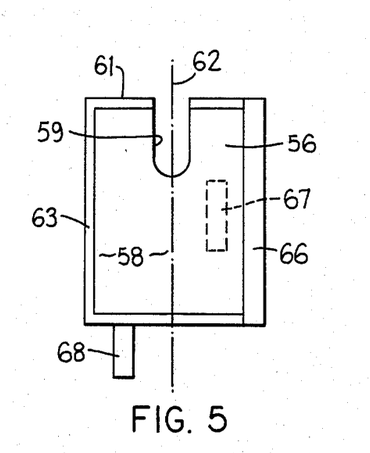

Considering now the bag enclosure 18, and referring specifically to FIGS. 4 and 5, same is formed from a substantially rectangular fabric sheet 56, which sheet is generally of the same material as the fabric sheet 21. This fabric sheet 56 defines respective outer and inner faces 57 and 58, respectively. The sheet 56 has a slot 59 which extends downwardly from the upper edge 61 thereof. This slot is centered about and extends along the central line or plane 62. Slot 59 has a configuration corresponding to the slot 33 and hence terminates in a rounded blind end, whereby the slot projects only part way across the sheet 56, normally about one-third of the way thereacross. The outer periphery of the sheet 56 has a suitable edge binding 63 secured thereto, as by stitching.

The bag enclosure 18 is adapted to be folded into a sleeve or tubular configuration when in use, and for this purpose the sheet 56 is provided with fasteners thereon which, in the illustrated embodiment, comprise a first elongated fastener strip 64 which is secured to the outer face 57 and extends vertically along the complete length of the right side edge of the sheet, whereas a similar fastener strip 66 is secured adjacent the other side edge of the sheet 56 and is specifically secured to the inner face 58. These fastener strips 64 and 66 are preferably of hook-type and loop-type, respectively, Velcro so as to interengage with one another when the enclosure 18 is folded over into a tubular configuration.

Enclosure 18 has a further fastener 67, specifically a strip of loop-type Velcro, secured to the left side of the outer face 57, this fastener strip 67 being stitched to the outer face so as to be vertically oriented and positioned centrally between the upper and lower edges of the sheet. A further fastener, namely a hook-type Velcro strip 68, is secured to the right side of the sheet 56 and projects downwardly below the lower edge 69 thereof. This strip 68 is adapted to overlie and engage the strip 67 when the enclosure has been formed into its tubular shape, and the bottom thereof folded upwardly so as to define a support, as explained hereinafter.

The supporter 11 and bag enclosure 18 are suitably fixed together. For this purpose, the enclosure 18 is positioned so as to overlie the supporter 11 such that the outer face 57 of enclosure 18 directly confronts the outer face 22 of the supporter 11. The enclosure 18 and supporter 11 are disposed such that the slots 33 and 59 are aligned (FIG. 6), whereupon the two sheets 21 and 56 are fixedly joined together, as by stitching, around the boundary of the aligned and overlapped slots 33 and 59. A suitable edge binding 71 is also disposed so as to overlap the edge of the aligned slots, and is suitably fixedly secured, as by stitching, to assist in joining the two fabric sheets together. The stitching around the boundary of the aligned slots 33 and 59, in conjunction with the edging 71, comprises the sole structure for fixedly connecting the supporter 11 and enclosure 18 together. This hence permits the supporter 11 and the enclosure 18, and specifically the right and left flap portions of each thereof, to be easily deflected and deformed as necessary to permit utilization of the system.

The enclosure 18 is designed to enclose and support the collection bag 19 which, as illustrated by FIG. 7, comprises a conventional colostomy bag 76, which bag is normally of a clear plastics material. This bag 76 is generally open at the lower end thereof, and the upper end portion has a substantial area provided with an adhesive covered by a suitable backing strip. This backing strip is removed to expose the adhesive area of the bag, and a conventional adhesive blanket of the type sold commercially as the Hollihesive blanket, is secured over the adhesive area of the plastic bag 76. A suitable opening 78 is then formed through the adhesive blanket 77 and the plastic bag 76 to provide access to the interior of the bag. This adhesive blanket 77 also has a conventional removable backing sheet so as to expose the outer adhesive surface of the blanket 77 to permit application to the animal. The open lower end of the bag 76 is adapted to be closed by any conventional clip or tie 74 which can be removed to permit emptying of the bag.

Figure 8:
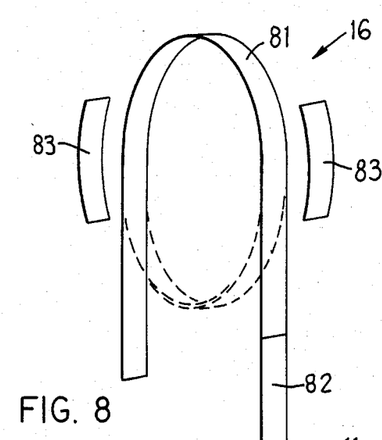
FIG. 8 diagrammatically illustrates the body strap.

Referring now to FIG. 8, the body strap 16 includes a main strap 81 formed from an elongated strip of flexible material, such as loop-type Velcro. A short fastener strip 82 is fixed to one end of the main strip 81, this end strip 82 preferably being hook-type Velcro oriented in the opposite direction from the loop portion 81 so as to permit the end portion 82 to lockingly engage the main strap 81 when same is wrapped around the body of the animal so as to form a closed loop. The main body strap 16 also includes a pair of short locking straps 83 which are also preferably of hook-type Velcro. The purpose of straps 83 is explained hereinafter.

Figure 9:
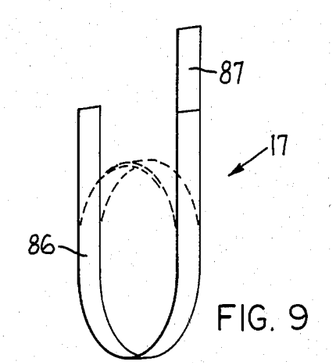
FIG. 9 diagrammatically illustrates the collar.

The collar strap 17, as illustrated by FIG. 9, is constructed similar to the main body strap 18. That is, it comprises an elongated strip 86 of flexible material, such as loop-type Velcro. This strip 86 has a fastening portion 87 fixedly secured to one end thereof, which fastening portion preferably comprises hook-type Velcro oriented in the same direction as the loop portion 86. The strap 17 is given a half-twist when it is wrapped around the neck of the animal and the ends secured together due to hook portion 87 engaging the loop strip 86 to form a closed collarlike loop.

OPERATION

The use and operation of the collection system 10 will be briefly described to insure a complete understanding thereof.

To apply the collection system to the animal, the hair on the dog's perianal area and hindquarters should be removed with electric hair clippers, preferably at least one day before the system is to be applied. After the shaven area has been appropriately cleaned, then the backing sheet is removed from the adhesive blanket 77, which blanket is preferably warmed slightly to improve the resulting adhesive seal. Thereafter the colostomy bag is positioned such that the adhesive blanket 77 has the opening 78 thereof centered over the animal's anus, whereupon the blanket is pressed and smoothed down over the adjacent shaven area to create a secure and sealed adhesive engagement therewith.

Figure 6:
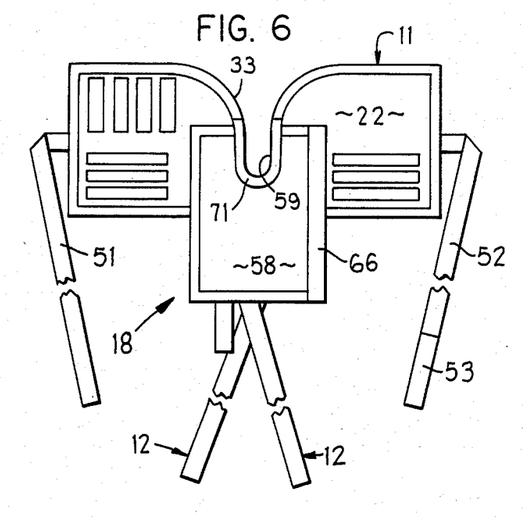
FIG. 6 illustrates the outer face of the supporter, the latter again being in an open condition, but showing the bag enclosure fixedly attached thereto.

After the colostomy bag has been attached as described above, then the body strap 16 is wrapped around the animal's body just rearwardly of the front legs, and fastened so as to form a closed loop. This trap is positioned with the loop side of the Velcro facing outwardly. The supporter 11 and attached enclosure 18, when in the open and substantially flat condition illustrated by FIG. 6, are then moved upwardly beneath the colostomy bag so as to be positioned directly adjacent but rearwardly of the animal's rear legs. The supporter 11 and enclosure 18 are lifted upwardly such that the upper portion of the colostomy bag 18 passes through the lower end of the slot 33, and the upper end of this slot accommodates the animal's tail. The flaps 26 and 27 are then folded forwardly and upwardly to overlie the hindquarters of the dog, whereupwardly upon the upper outer corners of the right and left flaps overlap atop the dog's hindquarters and are secured together due to the overlapping of the Velcro strips 43 and 44. The chest strap is then secured by extending the straps 51 and 52 forwardly along the sides of the animal so as to overlap in front of the dog's chest, whereupon the inwardly directed hooks on the fastener portion 53 engage the outwardly directed loops on the strap 51.

The supporter is then adjusted so as to be properly positioned on the dog, and if the dog is a female, the supporter 11 is adjustably positioned such that the animal's vulva protrudes through the opening 31. The leg straps 12 are then passed beneath the body of the animal and then outwardly around opposite sides of the body just forwardly of the rear legs so that the straps wrap upwardly over the supporter and the loops thereof fixedly engage the hook Velcro strips 41 and 42 so as to secure the leg straps in the desired adjusted position. The collar strap 16 can then be positioned by wrapping the main neck strap 86, with a half-twist, around the animal's neck and securing same in a closed loop by means of the end part 87. The collar strap preferably is fed through the front end of the chest strap so as to interconnect the two and hence prevent the chest strap from slipping downwardly. The half-twist of the collar enables it to lay better around the neck when supporting the chest strap. In addition, the locking fasteners 83 associated with the body strap are positioned adjacent opposite sides of the body such that each one overlaps the chest strap and the adjacent portions of the body strap and hooks thereto, substantially as illustrated by FIG. 9, to prevent slippage of the chest strap.

The open lower end of the plastic bag 76 is then suitably closed by means of the clip or fastener 74, following which the enclosure 18 is folded rearwardly into a tubular shape to enclose the colostomy bag. When folded into this tubular shape, the fastener strips 64 and 66 overlap and are hence pressed together to secure the enclosure in this surrounding configuration. The lower end of the enclosure is then folded upwardly substantially as illustrated in FIG. 1 such that the fastener strip 68 overlaps the fastener strip 67, which strips are pressed together to hold the lower end of the enclosure in this upwardly folded condition so as to hence support the weight of the colostomy bag.

Figure 10:
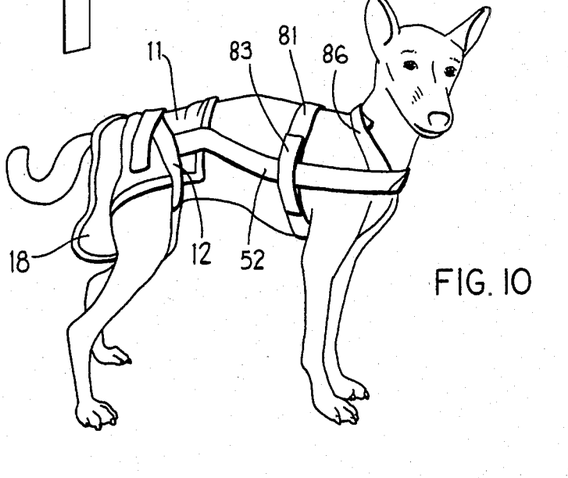
FIG. 10 illustrates the collection system as mounted on a dog.

With the system positioned as explained above, as illustrated by FIG. 10, the feces of the animal can be readily collected without contamination, and if necessary a further colostomy bag can be utilized for collecting a urine specimen without fear of cross-contamination. When this latter specimen bag is used, it is sealingly attached in surrounding relationship to the vulva for a female animal, or is attached around the penile sheath for a male animal. This invention can be modified to include a second fabric pouch to protect and hold the additional colostomy bag in place. This second pouch can be permanently attached, as by being stitched in place, or temporarily attached with Velcro strips. During use, the colostomy bag 19 can be readily inspected or emptied merely by opening the enclosure 18. At the same time, the system 10 as mounted on the animal does not restrict or restrain the animal as to its movements, or require close confinement thereof. However, an Elizabethan post-surgical collar should probably be applied to the animal to prevent it from chewing on the supporter.

It will be appreciated that other sheetlike materials or fabrics could be utilized for forming the supporter 11 and enclosure 18, and that other types of fasteners such as conventional hooks or snaps could be utilized in place of Velcro. However, the use of Velcro fasteners is preferred since this optimizes the adjustability of the system so that the same system can fit a substantial range of sizes of animals while at the same time this adjustability is achieved with structural simplicity, and the system is easy to mount on the animal.

While the system is particularly desirable for use on canines, and has been so described above, it will be appreciated that this system can and is intended for use on other four-legged animals merely by sizing the system in accordance with the selected animal.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A fecal collection system for attachment to a four-legged animal, comprising:
    supporter means adapted to be positioned on and conformed to the hips of the animal, said supporter means being constructed of a sheetlike flexible material having a center portion which is positioned closely adjacent but rearwardly of the hips, said supporter means also including right and left portions which are joined to the center portion and extend forwardly therefrom so as to respectively wrap around the right and left hips of the animal, said right and left portions also extending upwardly across the animal's back in the vicinity of the rear legs, said center portion having opening means formed therein for permitting a colostomy bag attached to the rear of the animal to extend therethrough so as to be positionable adjacent the outer face of said supporter means;

leg strap means attached to said supporter means for assisting in holding said supporter means in contoured engagement with said animal, said leg strap means including a pair of leg straps which have one end thereof attached to said center portion with said leg straps projecting forwardly between the rear legs and then upwardly adjacent the opposite outer sides of the animal's body for engagement with the right and left portions of said supporter means; and enclosure means attached to said supporter means and positioned rearwardly from the outer face thereof for enclosing the colostomy bag, said enclosure means being constructed of a sheetlike flexible material which assumes a substantially flat condition when the enclosure means is in an open position, said enclosure means having a portion thereof fixedly attached to said supporter means, said enclosure means being movable between said open position providing access to said colostomy bag and a closed position wherein the enclosure means defines a pocket for enclosing and supporting said colostomy bag, said enclosure means having releasable fastener means associated therewith for holding the enclosure means in said closed position but permitting opening of the enclosure means when access to the colostomy bag is desired.

2. A system according to claim 1, wherein said enclosure means includes a center part which is fixedly secured to the center portion of said supporter means, said center part also having opening means therein aligned with the opening means in said center portion for permitting said colostomy bag to extend therethrough, said enclosure means also including right and left parts which are fixed to said center part and which can be folded so as to form said enclosure means into a substantially sleevelike structure for enclosing said colostomy bag.

3. A fecal collection system for attachment to a four-legged animal, comprising:

supporter means adapted to be positioned on and conformed to the hips of the animal, said supporter means being constructed of a sheetlike flexible material having a center portion which is positioned closely adjacent but rearwardly of the hips, said supporter means also including right and left portions which are joined to the center portion and extend forwardly therefrom so as to respectively wrap around the right and left hips of the animal, said right and left portions also extending upwardly across the animal's back in the vicinity of the rear legs, said center portion having opening means formed therein for permitting a colostomy bag attached to the rear of the animal to extend therethrough so as to be positionable adjacent the outer face of said supporter means;

leg strap means attached to said supporter means for assisting in holding said supporter means in contoured engagement with said animal, said leg strap means including a pair of leg straps which have one end thereof attached to said center portion with said leg straps projecting forwardly between the rear legs and then upwardly adjacent the opposite outer sides of the animal's body for engagement with the right and left portions of said supporter means;

body harness means attached to said supporter means for holding said supporter means in contoured engagement with the hindquarter of the animal, said body harness means including elongated flexible chest strap means which extends around the chest of the animal and thence rearwardly along the opposite sides of the animal's body for attachment to the right and left portions of said supporter means; and enclosure means attached to said supporter means and positioned rearwardly from the outer face thereof for enclosing the colostomy bag, said enclosure means being constructed of a sheetlike flexible material having a center part which is fixedly secured to the center portion of said supporter means, said center part also having opening means therein aligned with the opening means in said center portion for permitting said colostomy bag to extend therethrough, said enclosure means including right and left parts which are joined to the center part and are movable between an open position providing access to said colostomy bag and a closed position wherein said enclosure means forms a substantially sleevelike structure for enclosing said colostomy bag;

said enclosure means having first fastener means coacting between the right and left parts thereof for holding the enclosure means in said sleevelike structure, the bottom portion of said sleevelike structure being foldable upwardly for closing the lower end thereof and for causing the weight of said colostomy bag to be supported by said enclosure means, and second fastener means for holding the bottom portion of the sleevelike structure in an upwardly folded condition.

4. A system according to claim 3, wherein each of said first-mentioned and second fastener means are defined by Velcro strips.

5. A fecal collection system for attachment to a four-legged animal, comprising:

supporter means adapted to be positiond on and conformed to the hips of the animal, said supporter means being constructed of a sheetlike flexible material having a center portion which is positioned closely adjacent but rearwardly of the hips, said supporter means also including right and left portions which are joined to the center portion and extend forwardly therefrom so as to respectively wrap around the right and left hips of the animal, said right and left portions also extending upwardly across the animal's back in the vicinity of the rear legs, said center portion having opening means formed therein for permitting a colostomy bag attached to the rear of the animal to extend therethrough so as to be positionable adjacent the outer face of said supporter means;

said supporter means assuming a substantially planar sheetlike condition when in an open position removed from the animal, said opening means as associated with the center portion of said supporter means comprising an elongated slot which extends along the central axis of the supporter means and opens upwardly through the upper edge thereof, the right and left portions of said supporter means being substantially symmetrical about said central axis and respectively defining right and left flaps which wrap around the respective right and left hips of the animal and then upwardly over the animal's back such that the right and left flaps overlap one another, said right and left flaps having first fastener means coacting between the overlapping upper portions thereof for releasably joining the overlapped upper portions of said right and left flaps together;

leg strap means attached to said supporter means for assisting in holding said supporter means in contoured engagement with said animal, said leg strap means including a pair of leg straps which have one end thereof attached to said center portion with said leg straps projecting forwardly between the rear legs and then upwardly adjacent the opposite outer sides of the animal's body for engagement with the right and left portions of said supporter means; and enclosure means attached to said supporter means and positioned rearwardly from the outer faced thereof for enclosing the colostomy bag, said enclosure means being constructed of a sheetlike flexible material having a portion thereof attached to said supporter means, said enclosure means being movable between an open position providing access to said colostomy bag and a closed position for enclosing said colostomy bag, said enclosure means having second fastener means associated therewith for holding the enclosure means in said closed position.

6. A system according to claim 5, wherein said first fastener means includes first and second Velcro strip means secured respectively to the right and left flaps in the upper portions thereof, one of said first and second Velcro strip means being secured to the inner face of its respective flap, and the other of said first and second strip means being secured to the outer face of its respective flap so that said first and second strip means overlap and are directly engaged with one another when the flaps are positioned in supportive and overlapping engagement on the animal.

7. A system according to claim 5, wherein said enclosure means includes a center part which is fixedly secured to the center portion of said supporter means, said center part also having opening means therein aligned with the opening means in said center portion for permitting said colostomy bag to extend therethrough, said enclosure means also including right and left parts which are fixed to said center part and which can be folded so as to form said enclosure means into a substantially sleevelike structure for enclosing said colostomy bag.

8. A system according to claim 7, wherein said second fastener means coacts between the right and left parts of said enclosure means for holding the latter in said sleevelike structure, the bottom portion of said sleevelike structure being foldable upwardly for closing the lower end thereof and for causing the weight of said colostomy bag to be supported by said enclosure means, and third fastener means associated with said enclosure means for holding the bottom portion of the sleevelike structure in an upwardly folded condition.

9. A system according to claim 8, wherein each of said fastener means is defined by Velcro strips.

10. A system according to claim 5, whwerein the center portion of said supporter means includes a sheetlike tongue portion which projects downwardly beyond the lower edge of said right and left portions, said tongue portion having an opening centrally positioned therein for accommodating the vulva of the animal, and said leg straps having one end thereof fixedly secured to said supporter means adjacent the opposite sides of said tongue portion, said leg straps as they extend away from said tongue portion being disposed so as to intersect one another, said leg straps being fixedly joined together at the point of intersection.

11. A system according to claim 5, including body harness means attached to said supporter means for holding said supporter means in contoured engagement with the hindquarter of the animal, said body harness means including elongated flexible chest strap means which extends around the chest of the animal and thence rearwardly along the opposite sides of the animal's body for attachment to the right and left portions of said supporter means.

12. A system according to claim 11, wherein said harness means also includes collar means which extends around the neck of the animal and is releasably attached to the chest strap means in the vicinity of the animal's chest, and body strap means extending around the body of the animal in the vicinity of but rearwardly of the animal's front legs, said body strap means having means associated therewith for fixedly connecting said body strap means to said chest strap means adjacent the opposite sides of the animal's body.

13. A system according to claim 12, wherein said leg strap means, said chest strap means, said collar means and said body strap means all include releasable fastener means defined by Velcro strips for permitting adjustment in the length of the respective means.

14. A fecal collection system for attachment to a four-legged animal, comprising:

supporter means adapted to be positioned on and conformed to the hips of the animal, said supporter means being constructed of a sheetlike flexible material having a center portion which is positioned closely adjacent but rearwardly of the hips, said supporter means also including right and left portions which are joined to the center portion and extend forwardly therefrom so as to respectively wrap around the right and left hips of the animal, said right and left portions also extending upwardly across the animal's back in the vicinity of the rear legs, said center portion having opening means formed therein for permitting a colostomy bag attached to the rear of the animal to extend therethrough so as to be positionable adjacent the outer face of said supporter means;

said supporter means when in an open position being able to assume a substantially flat and planar configuration, the opening means in said center portion comprising an elongated slot which extends along a central axis of the supporter means and opens outwardly through the upper edge of said supporter means so that the right and left portions of said supporter means respectively define right and left flaps which fold forwardly and then upwardly in overlapping relationship when engaged with the hips of the animal;

leg strap means attached to said supporter means for assisting in holding said supporter means in contoured engagement with said animal, said leg strap means including a pair of leg straps which have one end thereof attached to said center portion with said leg straps projecting forwardly between the rear legs and then upwardly adjacent the opposite outer sides of the animal's body for engagement with the right and left portions of said supporter means;

body harness means attached to said supporter means for holding said supporter means in contoured engagement with the hindquarter of the animal, said body harness means including elongated flexible chest strap means which extends around the chest of the animal and thence rearwardly along the opposite sides of the animal's body for attachment to the right and left portions of said supporter means; and enclosure means attached to said supporter means and positioned rearwardly from the outer face thereof for enclosing the colostomy bag, said enclosure means being constructed of a sheetlike flexible material having a portion thereof attached to said supporter means, said enclosure means being movable between an open position providing access to said colostomy bag and a closed position for enclosing said colostomy bag, said enclosure means having fastener means associated therewith for holding the enclosure means in said closed position;

said enclosure means also being disposed in a substantially flat and planar relationship when in an open condition, said enclosure means being disposed so as to substantially overlap a part of the outer surface of said supporter means when both said enclosure means and said supporter means are in said open condition, the opening means in the center part of said enclosure means also being defined by an elongated slot which extends along the central axis of the enclosure means and opens upwardly through the upper edge thereof so that the slot in said enclosure means is directly aligned with and overlies the slot in said supporter means, said enclosure means being disposed with its upper edge spaced downwardly a substantial distance from the upper edge of said supporter means, said supporter means and said enclosure means being fixedly joined together solely in the overlapping regions thereof which directly border the aligned slots, and said enclosure means projecting downwardly a substantial distance below the lower edge of the right and left flaps.

15. A system according to claim 14, wherein the central portion of said supporter means includes a sheetlike tongue portion which projects downwardly below the lower edge of the right and left flaps, said tongue portion having a central opening therethrough adapted to accommodate the vulva of a female animal, said tongue portion having a lower edge which is spaced upwardly a substantial distance from the lower edge of the enclosure means.

16. A fecal collection system for attachment to a four-legged animal, comprising:

supporter means adapted to be positioned on and conformed to the hips of the animal, said supporter means being constructed of a sheetlike flexible material having a center portion which is positioned closely adjacent but rearwardly of the hips, said supporter means also including right and left portions which are joined to the center portion and extend forwardly therefrom said as to respectively wrap around the right and left hips of the animal, said right and left portions also extending upwardly across the animal's back in the vicinity of the rear legs, said center portion having opening means formed therein for permitting a colostomy bag attached to the rear of the animal to extend therethrough so as to be positionable adjacent the outer face of said supporter means, said center portion also having a sheetlike tongue portion which projects downwardly beyond the lower edge of said right and left portions, said tongue portion having an opening centrally positioned therein for accommodating the vulva of the animal;

leg strap means attached to said supporter means for assisting in holding said supporter means in contoured engagement with said animal, said leg strap means including a pair of leg straps which have one end thereof fixedly attached to said center portion adjacent the opposite sides of said tongue portion with said leg straps projecting forwardly between the rear legs and then upwardly adjacent the opposite outer sides of the animal's body for engagement with the right and left portions of said supporter means, said leg straps as they extend away from said tongue portion being disposed so as to intersect one another, said leg straps being fixedly joined together at the point of intersection;

body harness means attached to said supporter means for holding said supporter means in contoured engagement with the hindquarter of the animal, said body harness means including elongated flexible chest strap means which extends around the chest of the animal and thence rearwardly along the opposite sides of the animal's body for attachment to the right and left portions of said supporter means; and enclosure means attached to said supporter means and positioned rearwardly from the outer face thereof for enclosing the colostomy bag, said enclosure means being constructed of a sheetlike flexible material having a portion thereof attached to said supporter means, said enclosure means being movable between an open position providing access to said colostomy bag and a closed position for enclosing said colostomy bag, said enclosure means having fastener means associated therewith for holding the enclosure means in said closed postion.

* * * * *

UNITED STATES PATENT AND TRADEMARK OFFICE
CERTIFICATE OF CORRECTION

PATENT NO. : 4 510 887
DATED : April 16, 1985
INVENTOR(S) : Kay L. LINCOLN et al It is certified that error appears in the above-identified patent and that said Letters Patent is hereby corrected as shown below:

Column 1, line 46; change "comfort" to ---discomfort---.

Column 3, line 4; change "exretion" to ---excretion---.

Column 4, line 14; change "overly" to ---overlie---.

Column 7, line 39; delete "whereupwardly upon" and insert ---whereupon---.

Column 14, line 12; change "said" to ---so---.

Signed and Sealed this

Fifteenth Day of October 1985

[SEAL]

*Attest:*

*Attesting Officer*

DONALD J. QUIGG

Commissioner of Patents and Trademarks—Designate